United States Patent [19]

Shen

[11] Patent Number: 5,310,516
[45] Date of Patent: May 10, 1994

[54] METHOD OF MAKING A COMPOSITE RACKET

[76] Inventor: Walter Shen, No. 18, 20 Rd., Industry Dist., Taichung City, Taiwan

[21] Appl. No.: 10,895
[22] Filed: Jan. 29, 1993

Related U.S. Application Data

[62] Division of Ser. No. 879,674, May 6, 1992.

[51] Int. Cl.$^5$ ............................................ B29C 63/10
[52] U.S. Cl. .................................... 264/250; 264/258; 264/512
[58] Field of Search ............ 264/510, 512, 516, 257, 264/258, 314, 259, 250; 156/245, 156, 191

[56] References Cited

U.S. PATENT DOCUMENTS

| | | | |
|---|---|---|---|
| 3,755,037 | 8/1973 | Erwin et al. | 264/314 |
| 3,889,951 | 6/1975 | Schaefer et al. | 273/73 F |
| 3,892,831 | 7/1975 | Robin et al. | 264/314 |
| 4,007,929 | 2/1977 | Figa | 273/73 R |
| 4,052,060 | 10/1977 | Balkcom | 273/73 R |
| 4,070,019 | 1/1978 | Segal et al. | 273/73 F |
| 4,098,505 | 7/1978 | Thompson | 273/73 F |
| 4,183,776 | 1/1980 | Staub et al. | 264/258 |
| 4,324,400 | 4/1982 | Tse | 273/76 |
| 4,340,226 | 7/1982 | Haines | 273/73 F |
| 4,367,871 | 1/1983 | Schiefer | 273/29 A |
| 4,399,992 | 8/1983 | Molitor | 273/73 F |
| 4,436,305 | 3/1984 | Fernandez | 273/73 |
| 4,725,059 | 2/1988 | Du Gardin et al. | 273/73 G |
| 4,746,119 | 5/1988 | Jeanrot | 273/73 C |
| 4,836,545 | 6/1989 | Pompa | 273/80 B |
| 4,906,002 | 3/1990 | Goffney et al. | 273/73 G |
| 5,071,125 | 12/1991 | Shen | 273/73 R |
| 5,114,145 | 5/1992 | Yamaguchi et al. | 273/73 F |

FOREIGN PATENT DOCUMENTS 54-50582  4/1979  Japan .
2069342  8/1981  United Kingdom .

*Primary Examiner*—Catherine Timm
*Attorney, Agent, or Firm*—Pennie & Edmonds

[57] ABSTRACT

A composite racket having at least one portion made of a thermoplastic resin and having the remaining portion made of a thermosetting resin is disclosed. The thermoplastic and thermosetting resins provide different dynamic stiffness, flexibility and toughness so that the racket possesses desired characteristics in the zones where they are necessary. The racket is fabricated by preforming a fiber reinforced thermoplastic resin in a first mold to form one of the frame portions and placing this preformed portion in a second mold. A fiber reinforced thermosetting resin is then formed into the other frame portion in the second mold and joined to the frame portion formed using thermoplastic resin at the throat section of the racket.

4 Claims, 7 Drawing Sheets

METHOD OF MAKING A COMPOSITE RACKET

This is a division of application Ser. No. 07/879,674, filed May 6, 1992.

BACKGROUND OF THE INVENTION

1. Field of the Invention

This invention relates to a composite racket, and particularly to a composite racket which is made of a thermoplastic resin with a continuous fibrous matrix in at least one portion thereof and made of a thermosetting resin with a continuous fibrous matrix at the other portion.

2. Brief Description of the Prior art

It has been known that racket frames made of epoxy resins provide the advantages of high rigidity, good striking characteristics and easy fabrication. However, such racket frames produce substantial initial shock which will cause injury to the users and, in addition, cannot provide a sufficient impact strength Attempts were made to improve the impact strength and reduce initial shock or vibrational forces by altering the fibrous materials used in combination with the epoxy resins or by modifying the orientations of fibers. Nevertheless, the improved effects obtained thereby are not satisfactory owing to the limitation of using a single type of matrix resin. Use of a thermoplastic resin such as Nylon in the fabrication of the racket frame has been recently suggested for the purposes of reducing initial shock and vibrational forces and improving the impact strength. However, the high flexibility of the thermoplastic resin lowers the striking characteristics and the fabrication of a racket with a composite thermoplastic material is difficult.

U.S. Pat. No. 5,071,125 which is owned by the applicant of this invention discloses a racket which is made of two or more than two materials. It also discloses a preferred embodiment comprised of a head made of a material of high rigidity and a shaft made of a less rigid or stiff material so as to reduce shock transmitted to the hand of the user.

There are other patents such as U.S. Pat. Nos. 4,367,871, 4,052,060, 4,725,059, 4,746,119, 4,906,002 and 4,007,929 which concern the connection of two or more than two component parts of a racket frame. A composite racket disclosed in U.S. Pat. No. 4,725,059 comprises a shaft portion, two branches of a throat portion and a frame portion all of which are made of composite materials Each portion has a foam core and a sheath comprised of fiber webs or braids impregnated with a synthetic resin. The foam cores and the sheaths of the portions are made of different materials.

SUMMARY OF THE INVENTION

An object of the invention is to provide a racket frame which has at least one portion made of a thermoplastic resin and the other portion made of a thermosetting resin.

Another object of this invention is to provide a racket frame which is made of a thermosetting resin of high rigidity in at least one portion and made of a thermoplastic resin of less rigidity in the other portion thereby acquiring the advantages of both the thermosetting and the thermoplastic resin while compensating for the disadvantages thereof.

According to the present invention, a racket frame comprises at least one portion made of a thermoplastic resin and the other portion made of a thermosetting resin. In one aspect of the invention, a racket frame is fabricated by: preforming a shaft portion by using a first composite material containing a thermoplastic resin; placing said preformed shaft portion in a mold having a cavity to shape the head and the shaft simultaneously; and forming a head portion by using a second composite material containing a thermosetting resin in said mold, said head portion being formed integrally with said shaft portion; wherein said thermoplastic resin has a melting point higher than the curing temperature of said thermosetting resin. Preferably, the thermoplastic resin a low rigidity and the thermosetting resin has a high rigidity.

In another aspect of the invention, the thermoplastic resin is Nylon or polycarbonate or a thermoplastic alloy and the thermosetting resin is epoxy.

BRIEF DESCRIPTION OF THE DRAWINGS

The present exemplary preferred embodiments will be described in detailed with reference to the accompanying drawings, in which.

DETAILED DESCRIPTION OF THE PREFERRED EMBODIMENT

Figure 7:
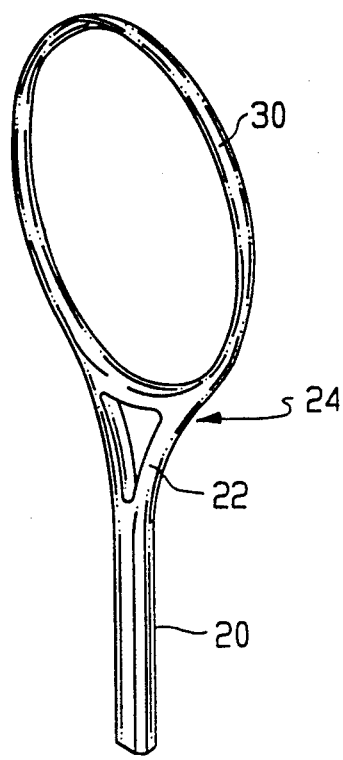
FIG. 7 shows the racket fabricated by the process of FIG. 1.

As shown in FIG. 7, a preferred embodiment of the racket of this invention includes a head portion 30 which is made of a composite material containing an epoxy resin and a shaft portion 20 including a throat 22 and made of a composite material containing nylon.

An example of the process for fabricating the racket of this invention comprises the first step of forming the shaft portion and the second step of forming the head portion together with the shaft portion.

Figure 1:
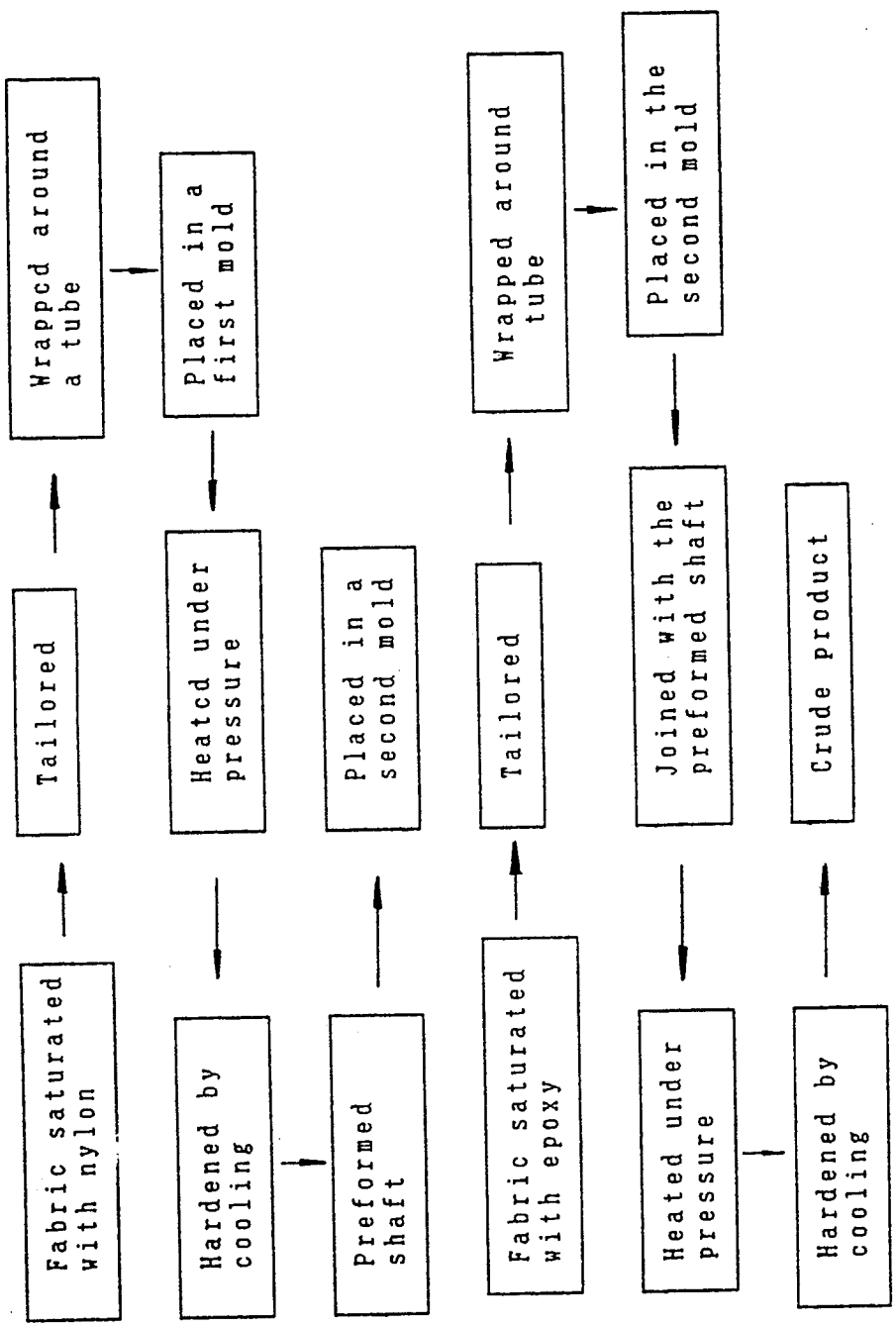
FIG. 1 is a flow diagram showing the process for fabricating the racket of this invention.

As shown in FIG. 1, a fabric material saturated with a Nylon resin composition is tailored and wrapped around a tube to form a roll member The resin-saturated fabric roll is placed in a first mold (FIG. 3) which has a mold cavity to form the shaft of the racket and is heated to 240 deg C. During heating, compressed air is introduced into the tube to create a pressure sufficient to pressurize the roll against the wall of the cavity of the mold. Afterward, the mold is cooled to harden the content thereof thereby resulting in a rough shaft. The rough shaft is placed in a second mold (FIG. 2) which has a cavity to impart the shape of a racket so as to combine with the head portion which will be formed later therein.

In forming the head portion, another fabric material saturated with an epoxy resin composition is tailored and wrapped around a tube to form a roll. The resin-impregnated fabric roll is placed in the second mold, and the tube thereof is inserted through the rough shaft and connected to a compressed air supply. After heating the mold to 150 deg C. to cure the epoxy resin and providing an appropriate interior air pressure via the tube, the mold is cooled and a racket frame is thereby obtained Referring to FIG. 2, a second mold 10 for forming the racket of this invention comprises a lower mold which has a cavity 11 to impart the shape of a racket. The cavity 11 has a portion to shape the head of the racket and another portion to shape the shaft of the racket. The lower mold can be closed by an upper mold and can be fastened thereto by means of locking means 13.

Figure 3:
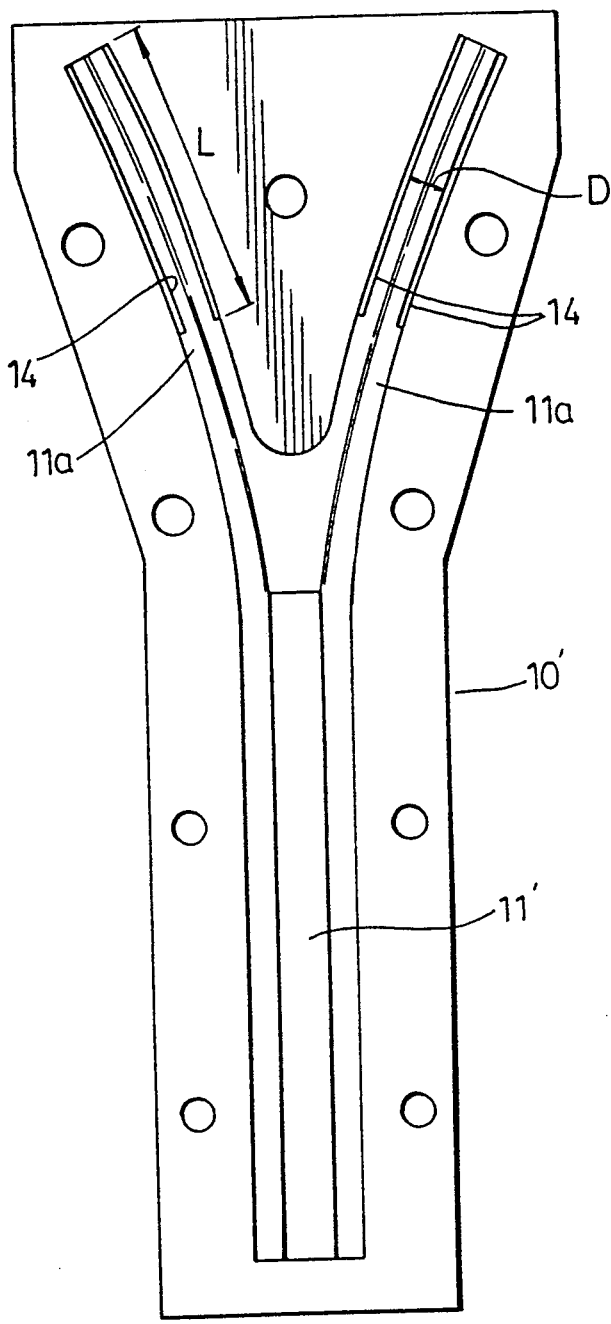
FIG. 3 is a plan view of the first mold used in the process of FIG. 1.

In FIG. 3, a first mold 10' for shaping the shaft of a racket is shown, having a cavity 11' to shape the racket shaft including a throat section. The cavity 11' has a substantially Y section which includes two arms 11a each of which has inward projecting wall surfaces 14 along the length L (preferably 1-15 cm) thereof thereby reducing the width of each arm 11a to D. Due to the portion of each arm 11a with a reduced width, the resultant preformed shaft has restricted joint portions in the throat section thereof which joint portions can overlappingly connected to the joint ends of the head which is formed later.

Figure 4:
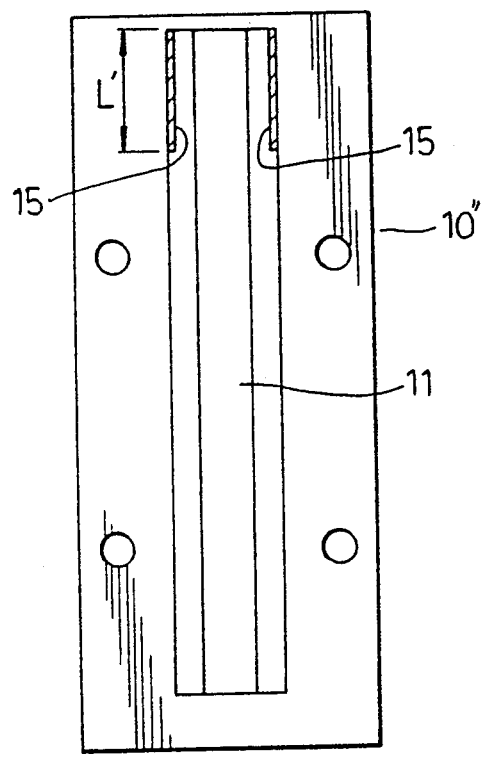
FIG. 4 is a plan view of an alternative first mold used in the process.

In FIG. 4, another example of the first mold 10'' is shown, having a cavity 11 to shape a shaft without a throat section. The mold cavity 11 has inward projecting wall surfaces 15 along the length L to provide a restricted joint end of the shaft.

Figure 2:
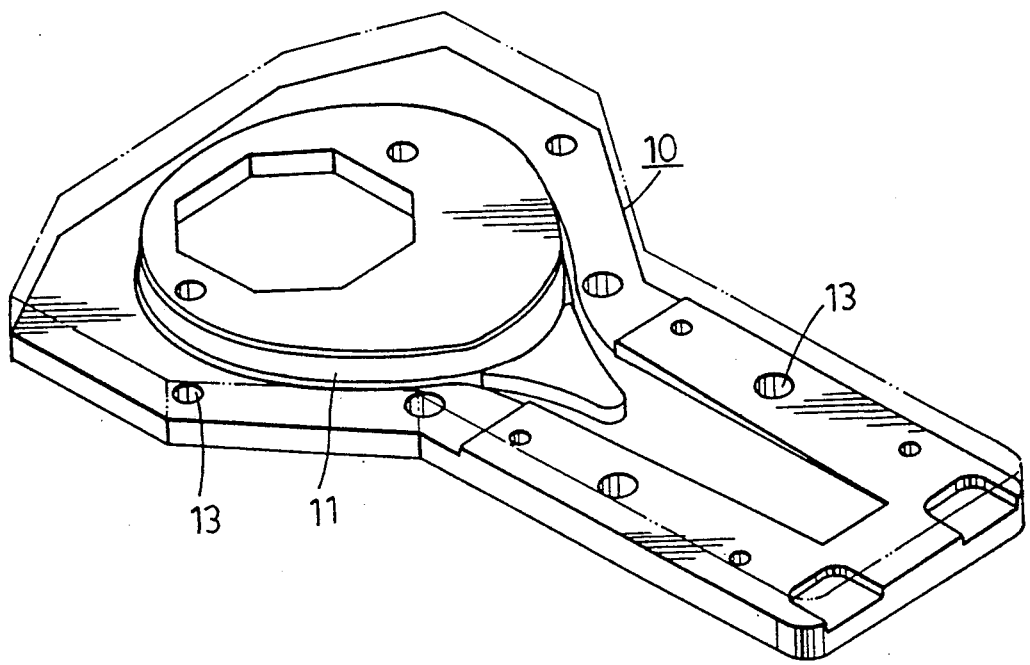
FIG. 2 is a perspective view of the second mold used in the process of FIG. 1.
Figure 5:
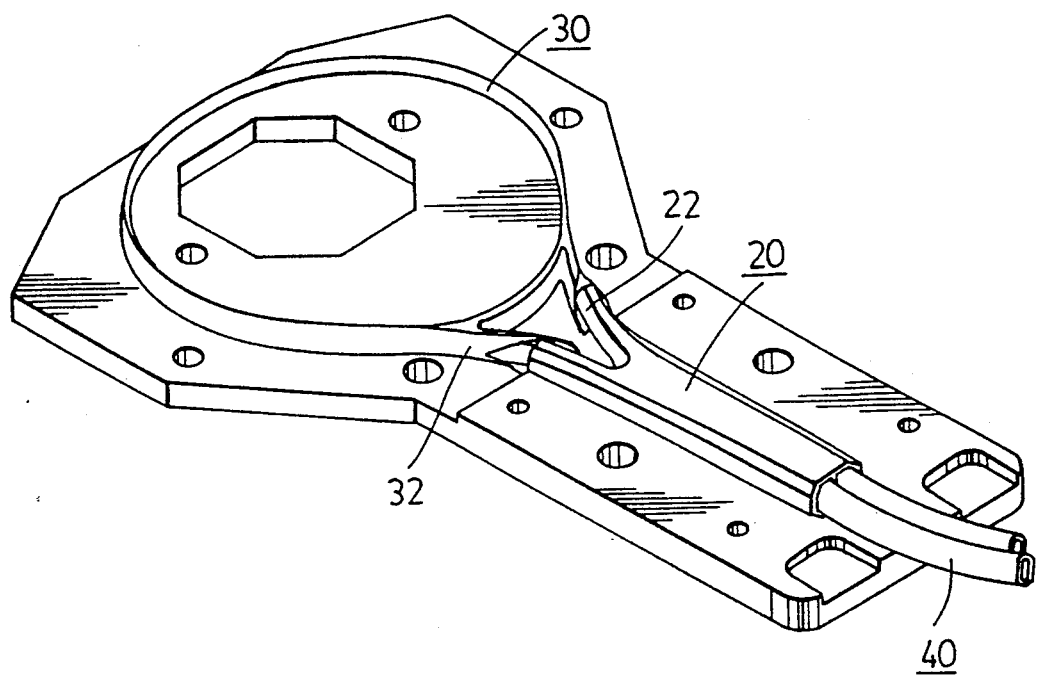
FIGS. 5 and 6 show the second mold with the head and the shaft placed therein.
Figure 6:
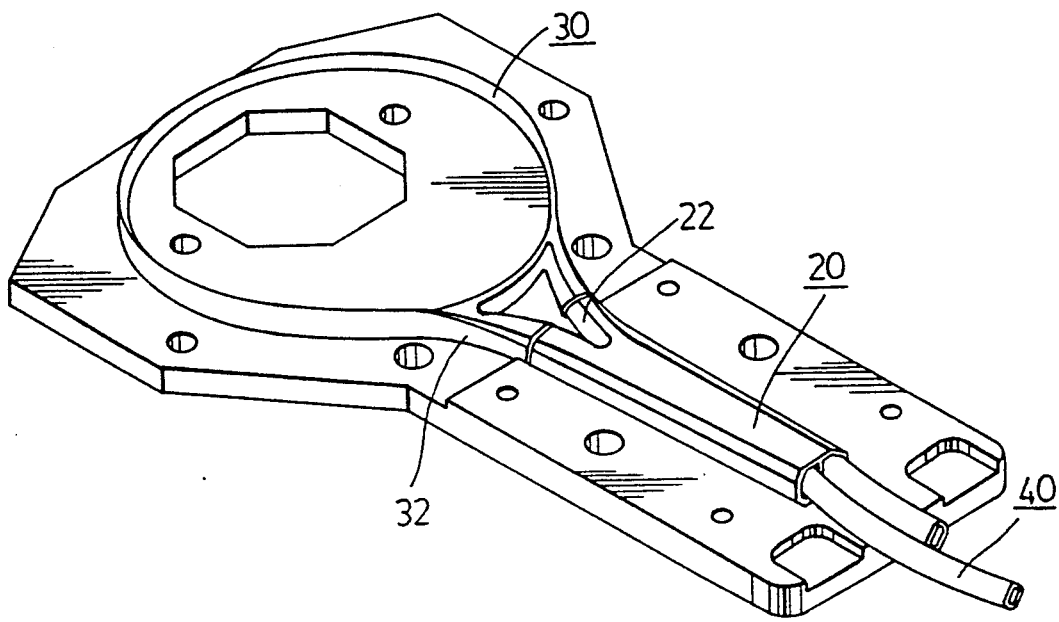

As shown in FIGS. 5 and 6, a shaft 20 preformed in the first mold 10' of FIG. 3 is placed in a second mold 10 of FIG. 2 and the joint ends 22 of the throat section 24 thereof are joined with the joint ends 32 of the fabric roll to form a head 30. In joining, the fabric of the head 30 overlaps the restricted joint ends of the shaft 20. These joints are strong and do not bulge. During the molding operation, air is supplied through the air tube 40 and the mold is heated. The crude product obtained from the mold 10 is further subjected to a conventional finishing process.

When comparing the racket of this invention with a conventional racket, this invention provides the following advantages:

1. This invention provides a composite racket construction achieved by using two different composite materials thereby obtaining the advantageous characteristics of both materials and compensating for the disadvantages thereof.
2. This invention provides a composite racket construction which has a high rigidity at its head while having a degree of flexibility to reduce shock at its shaft.
3. The racket of this invention may have a joint or more than one joint according to the number of the materials used to fabricate the racket.

While Nylon and epoxy are used in combination in the above-mentioned preferred embodiment, this invention is not limited thereto. Polycarbonate can be used instead of nylon in accordance with this invention. In addition, any combination of thermoplastic and thermosetting resins which can provide different dynamic stiffness and flexibility may be used according to this invention. Furthermore, although the above-mentioned embodiment shows that the head portion is made of a matrix thermoplastic resin and that the shaft including the throat is made of a matrix thermosetting resin, in another embodiment of this invention, a racket may have its throat made of a matrix thermoplastic resin and have its shaft and head made of a matrix thermosetting resin. According to still another aspect of this invention, the racket which is made of the same materials as the first embodiment can be fabricated by separately forming the head and the shaft thereof and then joining them using a tenon joint and fasteners.

With the invention thus explained, it is apparent that various modifications and variations can be made without departing from the scope of this invention. It is therefore intended that the scope of this invention be limited only as in the appended claims.

I claim:

1. The method of making a composite racket frame having a shaft defining a first frame position, a head defining a second frame portion, a throat section disposed between and through which said first and second portions are connected together and wherein one of said frame portions consists of fiber reinforced thermoplastic resin and the other of said frame portion consists of a fiber reinforced thermosetting resin; the method comprising the steps of:
   a) preforming said fiber reinforced thermoplastic resin in a first mold to form one of said frame portions;
   b) placing the preformed one frame portion in a second mold; and
   c) forming the fiber reinforced thermosetting resin into said other frame portion in said second mold and integrally joining it at said throat section to said first frame portion to form said racket frame.
2. The method as claimed in claim 1, wherein:
   a) said thermoplastic resin has a melting point higher than the curing temperature of said thermosetting resin.
3. The method as claimed in claim 2, wherein:
   a) said thermoplastic resin is selected from the group consisting of Nylon and polycarbonate; and
   b) said thermoplastic resin is used to preform said first frame portion.
4. The method as claimed in claim 2, wherein:
   a) said thermosetting resin is epoxy; and
   b) said thermosetting resin is used to form said second frame portion.

* * * * *